(12) United States Patent
Woo et al.

(10) Patent No.: US 12,270,671 B2
(45) Date of Patent: Apr. 8, 2025

(54) ELECTRONIC DEVICE AND CONTROL METHOD THEREOF

(71) Applicants: Hyundai Motor Company, Seoul (KR); Kia Corporation, Seoul (KR)

(72) Inventors: Jae Yul Woo, Seoul (KR); Soobin Kim, Seoul (KR); Seunghyun Woo, Seoul (KR); Rowoon An, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/857,834

(22) Filed: Jul. 5, 2022

(65) Prior Publication Data

US 2023/0143631 A1    May 11, 2023

(30) Foreign Application Priority Data

Nov. 10, 2021   (KR) .......................... 10-2021-0154101

(51) Int. Cl.
*G01C 21/36* (2006.01)
*G01C 21/34* (2006.01)
*G06F 3/14* (2006.01)

(52) U.S. Cl.
CPC ..... *G01C 21/3626* (2013.01); *G01C 21/3492* (2013.01); *G01C 21/3691* (2013.01); *G06F 3/14* (2013.01)

(58) Field of Classification Search
CPC ....... G08G 1/096844; G08G 1/096827; G08G 1/0969; G01C 21/3415; G01C 21/34; G01C 21/3694; G01C 21/3492; G01C 21/3632; G01C 21/3667; G01C 21/3676; G01C 21/343; G01C 21/3626
See application file for complete search history.

(56) References Cited

U.S. PATENT DOCUMENTS

| 8,738,036 B1 * | 5/2014 | Boyle ............... H04W 52/0251 455/456.1 |
| 8,866,673 B2 | 10/2014 | Mendelson |
| 8,924,149 B2 * | 12/2014 | Coppens ................ G09B 29/10 701/426 |
| 9,008,859 B2 | 4/2015 | Herzog et al. |
| 9,047,422 B2 * | 6/2015 | Kalai ..................... G06F 30/13 |

(Continued)

FOREIGN PATENT DOCUMENTS

| JP | 2002286491 A | 10/2002 |
| JP | 2010169490 A | 8/2010 |

(Continued)

OTHER PUBLICATIONS

Wagner et al. An approach for Hybrid Indoor/outdoor Navigation,(Year: 2017).*

*Primary Examiner* — Steven B Theriault

(74) *Attorney, Agent, or Firm* — Slater Matsil, LLP

(57) ABSTRACT

An embodiment electronic device includes a display module, a communicator configured to communicate with a server, an input module, and a controller configured to determine a route to be guided as a shortest path, from an indoor route or an outdoor route based on an input received at the input module from a user or based on an external environment, determine a route from a departure point to an arrival point based on the route to be guided as the shortest path, and control the display module to display the determined route.

26 Claims, 10 Drawing Sheets

(56) References Cited

U.S. PATENT DOCUMENTS

| | | | |
|---|---|---|---|
| 9,068,846 B1* | 6/2015 | Boerger | G06Q 10/1095 |
| 9,304,003 B1* | 4/2016 | Ashman | G01C 21/206 |
| 9,506,762 B2* | 11/2016 | Aoki | G01C 21/206 |
| 9,651,383 B2* | 5/2017 | Yang | G01C 21/3688 |
| 10,859,382 B1* | 12/2020 | Swidersky | G01C 21/206 |
| 11,105,635 B2* | 8/2021 | Varoglu | G01C 21/206 |
| 11,156,465 B2* | 10/2021 | Roy | G01C 21/206 |
| 11,169,280 B2* | 11/2021 | Akpinar | G01S 19/49 |
| 11,222,299 B1* | 1/2022 | Baalke | G06Q 10/087 |
| 2007/0001904 A1* | 1/2007 | Mendelson | G01C 21/206 |
| | | | 342/450 |
| 2009/0171563 A1* | 7/2009 | Morimoto | G01C 21/3685 |
| | | | 701/533 |
| 2009/0201176 A1* | 8/2009 | Shimada | G01C 21/20 |
| | | | 340/944 |
| 2009/0216438 A1* | 8/2009 | Shafer | G01C 21/206 |
| | | | 701/414 |
| 2009/0299620 A1* | 12/2009 | Shin | G01C 21/3484 |
| | | | 701/532 |
| 2010/0125409 A1* | 5/2010 | Prehofer | G01C 21/206 |
| | | | 701/408 |
| 2010/0185384 A1* | 7/2010 | Naito | G01C 21/26 |
| | | | 707/E17.107 |
| 2011/0172906 A1* | 7/2011 | Das | G01C 21/206 |
| | | | 701/533 |
| 2012/0016578 A1* | 1/2012 | Coppens | G09B 29/003 |
| | | | 701/433 |
| 2012/0072052 A1* | 3/2012 | Powers | G05D 1/0044 |
| | | | 701/2 |
| 2013/0144525 A1* | 6/2013 | Yang | G01C 21/3688 |
| | | | 701/533 |
| 2014/0088860 A1* | 3/2014 | Poornachandran | G01C 21/206 |
| | | | 701/410 |
| 2014/0253538 A1* | 9/2014 | Bailiang | G06T 15/20 |
| | | | 345/419 |
| 2014/0309924 A1* | 10/2014 | Varoglu | G01C 21/206 |
| | | | 701/457 |
| 2014/0372032 A1* | 12/2014 | Canner | G01C 21/206 |
| | | | 701/533 |
| 2015/0052460 A1* | 2/2015 | Mohammad Mirzaei | G06F 3/0484 |
| | | | 715/764 |
| 2015/0185022 A1* | 7/2015 | Yoo | H04W 4/024 |
| | | | 701/408 |
| 2015/0260541 A1* | 9/2015 | Smith | G01C 21/206 |
| | | | 701/439 |
| 2015/0330787 A1* | 11/2015 | Cioffi | G01C 21/20 |
| | | | 701/538 |
| 2016/0334236 A1* | 11/2016 | Mason | G01C 21/3461 |
| 2017/0006429 A1* | 1/2017 | Douglas | H04W 4/023 |
| 2017/0262790 A1* | 9/2017 | Khasis | G08G 1/012 |
| 2018/0164817 A1* | 6/2018 | Herz | G05D 1/0212 |
| 2018/0180744 A1* | 6/2018 | Lu | G01S 5/0205 |
| 2019/0011267 A1* | 1/2019 | Yuan | G01C 21/206 |
| 2019/0063947 A1* | 2/2019 | Beaurepaire | G01C 21/3423 |
| 2019/0333369 A1* | 10/2019 | Malkes | G08G 1/096838 |
| 2020/0005641 A1* | 1/2020 | Park | G08G 1/168 |
| 2020/0116494 A1* | 4/2020 | Yu | A63F 13/216 |
| 2020/0209010 A1* | 7/2020 | Beaurepaire | G08G 1/143 |
| 2020/0260221 A1* | 8/2020 | Won | G01C 21/362 |
| 2020/0312144 A1* | 10/2020 | Noguchi | G08G 1/143 |
| 2020/0378775 A1* | 12/2020 | Beaurepaire | G01C 21/3423 |
| 2020/0384985 A1* | 12/2020 | Noguchi | G08G 1/096811 |
| 2020/0413458 A1* | 12/2020 | Kennedy | H04W 4/40 |
| 2021/0110683 A1* | 4/2021 | Guan | G01C 21/3461 |
| 2021/0192229 A1* | 6/2021 | Johnson | G06T 7/73 |
| 2021/0217310 A1* | 7/2021 | Ikoma | B60W 30/06 |
| 2021/0231455 A1* | 7/2021 | Nguyen | G01C 21/3811 |
| 2021/0270617 A1* | 9/2021 | Spielman | H04W 4/021 |
| 2021/0270631 A1* | 9/2021 | Spielman | G01C 21/3655 |
| 2021/0281977 A1* | 9/2021 | Ebner | H04W 4/029 |
| 2021/0341300 A1* | 11/2021 | Beaurepaire | G01C 21/3492 |
| 2021/0354772 A1* | 11/2021 | Askin | B62J 6/03 |
| 2021/0398424 A1* | 12/2021 | Lee | G08G 1/017 |
| 2022/0164747 A1* | 5/2022 | Shah | G06Q 10/20 |
| 2022/0357161 A1* | 11/2022 | DeLuca | G06V 10/56 |
| 2022/0364878 A1* | 11/2022 | DeLuca | G06T 11/001 |
| 2023/0127182 A1* | 4/2023 | Mayster | G01C 21/3667 |
| | | | 701/423 |
| 2023/0237430 A1* | 7/2023 | Guhya | G01W 1/02 |
| | | | 348/117 |

FOREIGN PATENT DOCUMENTS

| | | |
|---|---|---|
| KR | 20140089105 A | 7/2014 |
| KR | 101822622 B1 | 1/2018 |

* cited by examiner

ELECTRONIC DEVICE AND CONTROL METHOD THEREOF

CROSS-REFERENCE TO RELATED APPLICATIONS

This application claims the benefit of Korean Patent Application No. 10-2021-0154101, filed on Nov. 10, 2021, which application is hereby incorporated herein by reference.

TECHNICAL FIELD

The disclosure relates to an electronic device and a control method thereof.

BACKGROUND

With the development of digital technology, various types of electronic devices such as a mobile communication terminal, smartphone, tablet personal computer (PC), laptop, personal digital assistant (PDA), wearable device, digital camera, personal computer, etc., are widely used.

Recently, in addition to functions that may be performed by an electronic device such as a call, multimedia playback (e.g., music playback and video playback), and Internet, research on a navigation function is increasing.

The navigation function above is performed in a vehicle as well, and a global positioning system (GPS) for recognizing a current location is generally used when electronic devices and vehicles perform the navigation function.

In relation to the navigation function, as interest in delivery service and indoor spatial information has recently increased, a demand for integrated indoor/outdoor navigation has risen. However, indoor and outdoor location information is stored in different ways since both are collected differently, which prevents an integrated navigation from being performed. Also, because navigation algorithms and services are developed in a fragmented way indoors and outdoors, navigation services that connect indoors to outdoors or outdoors to indoors are not being provided.

SUMMARY

The disclosure relates to an electronic device and a control method thereof. Particular embodiments relate to an electronic device and a control method thereof that provides a user with route guidance.

An embodiment of the disclosure provides an electronic device and a control method thereof that may automatically perform a pre-stored function when a passenger having a personal identification device with a pre-stored identifier (ID) boards the vehicle, in order to enhance convenience of a fellow passenger.

According to an embodiment of the disclosure, there is provided an electronic device including a display module, a communicator configured to communicate with a server, an input module configured to receive an input from a user, and a controller configured to determine a route to be guided as a shortest path, from an indoor route or an outdoor route based on the input from the user or an external environment received from the server, determine a route from a departure point to an arrival point based on the route to be guided as the shortest path, and control the display module to display the determined route.

The route from the departure point to the arrival point includes the indoor route and the outdoor route.

The communicator is configured to receive at least one of weather environment information or traffic environment information from the server.

The controller is configured to control to set the route to be guided as the shortest path as the outdoor route, when the communicator receives environment information about rain or high temperature from the server.

The controller is configured to control to set the route to be guided as the shortest path as the outdoor route, when the communicator receives traffic congestion information from the server.

When the departure point is indoors, the arrival point is outdoors and the route to be guided as the shortest path is the indoor route, the controller is configured to control the display module to display shortest route guidance information from the departure point to an indoor exit, and display route guidance information from the indoor exit to the arrival point, the departure point and the arrival point being input by the user.

When the departure point is indoors, the arrival point is outdoors and the route to be guided as the shortest path is the outdoor route, the controller is configured to control the display module to display shortest route guidance information to the arrival point from a first exit closest to the arrival point among a plurality of indoor exits, and display route guidance information from the departure point to the first exit, the departure point and the arrival point being input by the user.

When the departure point is outdoors, the arrival point is indoors and the route to be guided as the shortest path is the indoor route, the controller is configured to control the display module to display route guidance information from the departure point to an indoor entrance, and display shortest route guidance information from the indoor entrance to the arrival point, the departure point and the arrival point being input by the user.

When the departure point is outdoors, the arrival point is indoors and the route to be guided as the shortest path is the outdoor route, the controller is configured to control the display module to display shortest route guidance information from the departure point to a first entrance closest to the departure point among a plurality of indoor entrances, and display route guidance information from the first entrance to the arrival point, the departure point and the arrival point being input by the user.

The input module is configured to receive information about means of transportation from the user.

When the user inputs a vehicle as the means of transportation, the controller is configured to set an indoor entrance and an indoor exit as an entrance and an exit close to a parking lot, respectively, to control the display module to display route guidance information.

When the user inputs a two-wheeled vehicle or a bicycle as the means of transportation, the controller is configured to set an indoor entrance and an indoor exit as an entrance and an exit close to an outside, respectively, to control the display module to display route guidance information.

According to an embodiment of the disclosure, there is provided a control method of an electronic device, the control method including receiving an input from a user, performing communication with a server, determining a route to be guided as a shortest path, from an indoor route or an outdoor route based on the input from the user or an external environment received from the server, determining a route from a departure point to an arrival point based on the route to be guided as the shortest path, and displaying the determined route.

The route from the departure point to the arrival point includes the indoor route and the outdoor route.

The performing communication with the server includes receiving at least one of weather environment information or traffic environment information from the server.

The determining of the route to be guided as the shortest path includes setting the route to be guided as the shortest path as the outdoor route, when environment information about rain or high temperature is received from the server.

The determining of the route to be guided as the shortest path includes setting the route to be guided as the shortest path as the outdoor route, when traffic congestion information is received from the server.

When the departure point is indoors, the arrival point is outdoors and the route to be guided as the shortest path is the indoor route, the displaying of the determined route includes displaying shortest route guidance information from the departure point to an indoor exit, and displaying route guidance information from the indoor exit to the arrival point, the departure point and the arrival point being input by the user.

When the departure point is indoors, the arrival point is outdoors and the route to be guided as the shortest path is the outdoor route, the displaying of the determined route includes displaying shortest route guidance information to the arrival point from a first exit closest to the arrival point among a plurality of indoor exits, and displaying route guidance information from the departure point to the first exit, the departure point and the arrival point being input by the user.

When the departure point is outdoors, the arrival point is indoors and the route to be guided as the shortest path is the indoor route, the displaying of the determined route includes displaying route guidance information from the departure point to an indoor entrance, and displaying shortest route guidance information from the indoor entrance to the arrival point, the departure point and the arrival point being input by the user.

When the departure point is outdoors, the arrival point is indoors and the route to be guided as the shortest path is the outdoor route, the displaying of the determined route includes displaying shortest route guidance information from the departure point to a first entrance closest to the departure point among a plurality of indoor entrances, and displaying route guidance information from the first entrance to the arrival point, the departure point and the arrival point being input by the user.

The receiving of the input from the user includes receiving information about means of transportation from the user.

When the user inputs a vehicle as the means of transportation, the displaying of the determined route includes setting an indoor entrance and an indoor exit as an entrance and an exit close to a parking lot, respectively, to display route guidance information.

When the user inputs a two-wheeled vehicle or a bicycle as the means of transportation, the displaying of the determined route includes setting an indoor entrance and an indoor exit as an entrance and an exit close to an outside, respectively, to display route guidance information.

BRIEF DESCRIPTION OF THE DRAWINGS

These and/or other embodiments of the disclosure will become apparent and more readily appreciated from the following description of the exemplary embodiments, taken in conjunction with the accompanying drawings in which.

DETAILED DESCRIPTION OF ILLUSTRATIVE EMBODIMENTS

Figure 1:
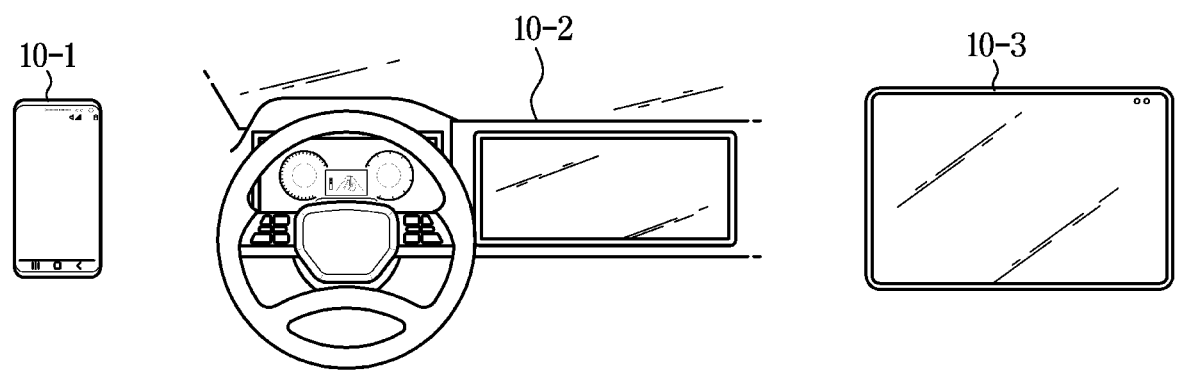
FIG. 1 is a diagram illustrating various electronic devices displaying route guidance information.

Like reference numerals throughout the specification denote like elements. Also, this specification does not describe all the elements according to embodiments of the disclosure, and descriptions well-known in the art to which the disclosure pertains or overlapped portions are omitted. The terms such as "~part", "~member", "~module", "~block", and the like may refer to at least one process processed by at least one hardware or software. According to embodiments, a plurality of "~parts", "~members", "~modules", "~blocks" may be embodied as a single element, or a single of "~part", "~member", "~module", "~block" may include a plurality of elements.

It will be understood that when an element is referred to as being "connected" to another element, it can be directly or indirectly connected to the other element, wherein the indirect connection includes "connection" via a wireless communication network.

It will be understood that the term "include" when used in this specification, specifies the presence of stated features, integers, steps, operations, elements, and/or components, but does not preclude the presence or addition of one or more other features, integers, steps, operations, elements, components, and/or groups thereof.

It will be understood that when it is stated in this specification that a member is located "on" another member, not only may a member be in contact with another member, but also still another member may be present between the two members.

It will be understood that, although the terms first, second, etc. may be used herein to describe various elements, these elements should not be limited by these terms.

It is to be understood that the singular forms are intended to include the plural forms as well, unless the context clearly dictates otherwise.

Reference numerals used for method steps are just used for convenience of explanation, but not to limit an order of the steps. Thus, unless the context clearly dictates otherwise, the written order may be practiced otherwise.

Hereinafter, an operation principle and embodiments will be described in detail with reference to the accompanying drawings.

FIG. 1 is a diagram illustrating various electronic devices displaying route guidance information.

The electronic device 10 may be a portable terminal.

The electronic device 10 may be a terminal that may be detachably mounted on a vehicle or a terminal that may be embedded in a dashboard of the vehicle. The electronic device 10 may be an audio, video, navigation (AVN) terminal that performs audio, video and navigation functions.

The electronic device 10 may be embodied as a computer or portable terminal that may access the vehicle through a network.

For example, the computer may include a laptop, desktop, tablet personal computer (PC), slate PC, etc., equipped with a web browser. Also, for example, the portable terminal, as a wireless communication device that guarantees portability and mobility, may include all types of handheld-based wireless communication devices such as a personal communication system (PCS), global system for mobile communications (GSM), personal digital cellular (PDC), personal handyphone system (PHS), personal digital assistant (PDA), international mobile telecommunication (IMT)-2000, code division multiple access (CDMA)-2000, W-CDMA, wireless broadband internet (Wibro), smartphone, and also include wearable devices such as a watch, ring, bracelet, necklace, eyeglasses, contact lenses, head-mounted-devices (HMDs), and the like.

Among the above, a portable smartphone 10-1, an AVN terminal 10-2 mounted on a dashboard of the vehicle, and the portable electronic device 10-3 are illustrated in FIG. 1.

A user may be provided with a route guidance service through the electronic device 10 described above.

Figure 2:
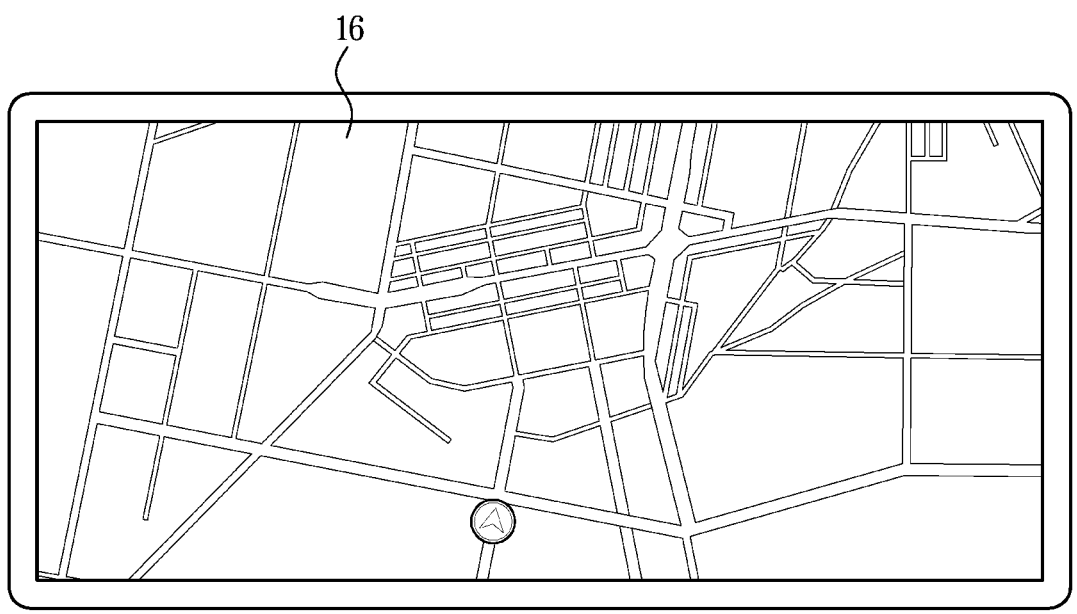
FIG. 2 is a diagram illustrating a route guidance screen provided by a route guidance service.
Figure 3:
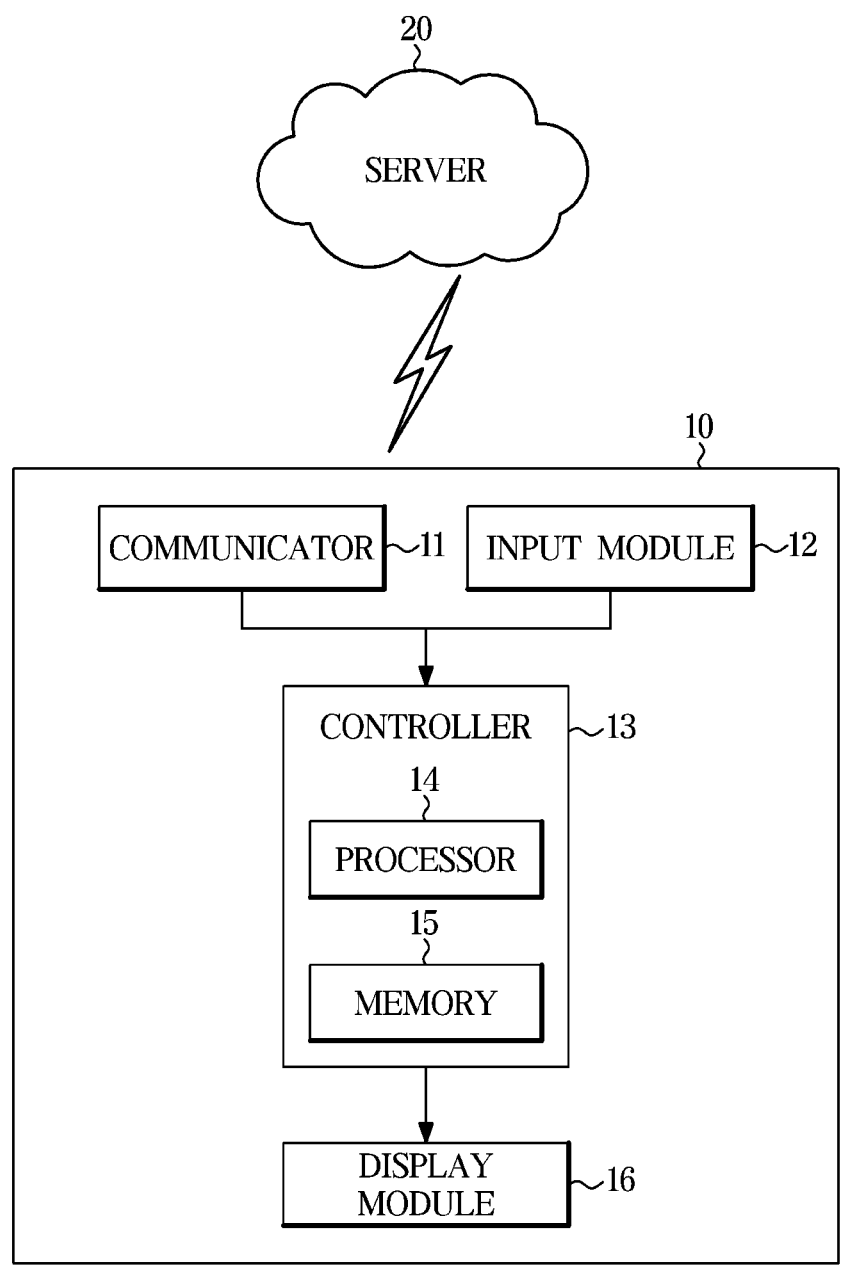
FIG. 3 is a control block diagram illustrating an electronic device according to an embodiment.

FIG. 2 is a diagram illustrating a route guidance screen provided by a route guidance service. FIG. 3 is a control block diagram illustrating an electronic device according to an embodiment.

In general, a navigation system may provide a user with a route to a destination or map information about a specific location. The map information provided allows the user to move to the destination along the route.

Recently, as a demand for route guidance from indoors to outdoors and from outdoors to indoors increases, a route guidance service capable of simultaneously providing both indoor and outdoor route guidance is highly required.

Hereinafter, the electronic device 10 that provides route guidance about all routes from indoors to outdoors and from outdoors to indoors is described.

Referring to FIG. 3, according to an embodiment, the electronic device 10 may include a communicator 11, an input module 12, a controller 13 and a display module 16.

The communicator 11 may receive information about an external environment from a server 20 by communicating with the server 20. Also, the communicator 11 may transmit the information received from the server 20 to the controller 13 of the electronic device 10.

The communicator 11 may include at least one constituent component for enabling the constituent components of the electronic device 10 to communicate with each other, such as a short-range communication module, a wired communication module, and a wireless communication module, and the like.

The short-range communication module may include a variety of short-range communication modules that transmit/receive a signal using a wireless communication network over short distances, such as a Bluetooth™ module, an infrared communication module, a radio frequency identification (RFID) communication module, a wireless local access network (WLAN) communication module, a near field communication (NFC) module, a Zigbee communication module, and the like.

The wired communication module may include various wired communication modules such as a controller area network (CAN) communication module, a local area network (LAN) module, a wide area network (WAN) module, a value added network (VAN) module, etc., and may also include various cable communication modules such as a universal serial bus (USB), a high definition multimedia interface (HDMI), a digital visual interface (DVI), a recommended standard 232 (RS-232), a power line communication, a plain old telephone service (POTS), etc.

The wired communication module may further include a local interconnect network (LIN).

The wireless communication module may include a WiFi module, a wireless broadband (Wibro) module, and may also include wireless communication modules supporting various wireless communication methods, such as a global system for mobile communication (GSM), code division multiple access (CDMA), wideband code division multiple access (WCDMA), universal mobile telecommunications system (UMTS), time division multiple access (TDMA), long term evolution (LTE), ultra wide band (UWB), and the like.

The input module 12 may receive a user input.

The input module 12 may receive an execution command of a navigation application for performing a navigation function, and receive information about a departure point and an arrival point in response to an execution of the navigation function.

The input module 12 may receive information about a route for which a shortest route guidance is desired by a user, from among an indoor route or outdoor route.

The input module 12 may receive information about a means of transportation that the user is on from the user. For example, when the user is in a vehicle, the input module 12 may receive an input indicating that the vehicle is used as the means of transportation.

The input module 12 may be implemented as a jog dial or a touch pad for inputting a cursor movement command, an icon or button selection command, etc., displayed on the display module 16.

The input module 12 may include various hardware devices such as buttons, switches, levers, pedal, keyboard, mouse, trackball, handle, stick, and the like.

Also, the input module 12 may include a software device, that is, a graphical user interface (GUI) such as a touch panel, etc. The touch panel may be implemented as a touch screen panel (TSP) to form a layer structure with the display module 16.

The controller 13 may determine a route to be guided as the shortest path from among the indoor route or outdoor route, based on the user input received by the input module 12 and the external environment received from the server 20.

For instance, when the user inputs a route for which a shortest route guidance is desired as the indoor route, the controller 13 may determine the route to be guided as the shortest path as the indoor route according to the user input.

Also, when receiving information about weather or traffic conditions among the information about the external environment from the server 20, the controller 13 may automatically determine the route to be guided as the shortest path by reflecting the information, which is described in detail later.

The controller 13 may determine a route from a departure point to an arrival point input by the user, based on the route to be guided as the shortest path.

The route from the departure point to the arrival point may include the indoor route and the outdoor route.

That is, when the route to be guided as the shortest path is outdoors, the controller 13 may determine the route to be guided as the shortest path as the outdoor route, and a normal route as the indoor route.

As such, the controller 13 may determine the route from the departure point to the arrival point, considering the route to be guided as the shortest path which is determined based on the user input or the external environment.

The controller 13 may control the display module 16 to provide the user with the route from the departure point to the arrival point which is determined through the above-described operations.

Through the control of the display module 16, the user may view a route guidance screen, thereby going to the arrival point along the guided route.

The controller 13 may include a memory 15 for determining the route to be guided as the shortest path and providing route guidance about the determined route, and a processor 14 for generating a control signal according to a control program and control data stored in the memory 15. The memory 15 and the processor 14 may be provided integrally or separately.

The memory 15 may store a program or data for determining the route to be guided as the shortest path and for providing route guidance based on the determined route. Also, the memory 15 may store information about an indoor entrance/exit.

The memory 15 may include a volatile memory for temporarily storing data such as a static random access memory (SRAM) and dynamic random access memory (DRAM), and a non-volatile memory for storing data for a long period of time such as a read only memory (ROM), an erasable programmable read only memory (EPROM), an electrically erasable programmable read only memory (EEPROM), and the like.

The processor 14 may include various logic circuits and arithmetic circuits, process data according to the program provided from the memory 15, and generate a control signal according to a result of the processing.

The display module 16 may provide the user with a screen for providing route guidance and receiving various information.

The display module 16 may display the route guidance screen to provide the route determined by the controller 13, and a screen allowing the user to input a departure point, an arrival point, means of transportation used by the user, and the like.

As the screens described above are provided to the user, the user may input information related to route guidance through the input module 12, thereby being guided with the route.

The display module 16 may be provided as a cathode ray tube (CRT), digital light processing (DLP), plasma display panel, liquid crystal display (LCD) panel, electro luminescence (EL) panel, electrophoretic display (EPD) panel, electrochromic display (ECD) panel, light emitting diode (LED) panel, and organic light emitting diode (OLED) panel, without being limited thereto.

At least one constituent component may be added or deleted according to a performance of the constituent components of the electronic device 10 illustrated in FIG. 3. In addition, it is to be understood by those skilled in the art that mutual positions of the constituent components may be changed corresponding to a performance or structure of system.

Hereinafter, operations of determining a route to be guided as a shortest path and displaying the determined route by the constituent components of the electronic device 10 are described in detail.

FIGS. 4 to 7 are diagrams illustrating screens displaying routes including a route determined as a route to be guided as a shortest path.

As described above, the controller 13 may determine a route to be guided as a shortest path, considering a user input and external environment received from the server 20.

When a user directly inputs a route for which a shortest route guidance is desired, the route input by the user may be guided as the shortest path. When the user inputs the route for which the shortest route guidance is desired as an indoor route, the indoor route may be guided as the shortest path, and when the user inputs the route for which the shortest route guidance is desired as an outdoor route, the outdoor route may be guided as the shortest path.

However, in addition to the user input, the route to be guided as the shortest path may be determined automatically considering weather or traffic conditions.

In general, when an outdoor temperature is high or it rains a lot, people do not want to stay outdoors for a long time. Accordingly, when environment information about a high temperature or rain is received from the server 20, the controller 13 may determine the route to be guided as the shortest path, as the outdoor route.

Also, in severe road congestion due to an increase in traffic volume, people generally do not want to drive outdoors, and thus when information about traffic congestion is received from the server 20, the controller 13 may determine the route to be guided as the shortest path, as the outdoor route.

As such, the route to be guided as the shortest path may be determined considering the user input and external environment received from the server 20, and provided to the user accordingly.

Hereinafter, when a departure point and an arrival point are different from each other as indoors or outdoors, route guidance different for each case is described.

Figure 4:
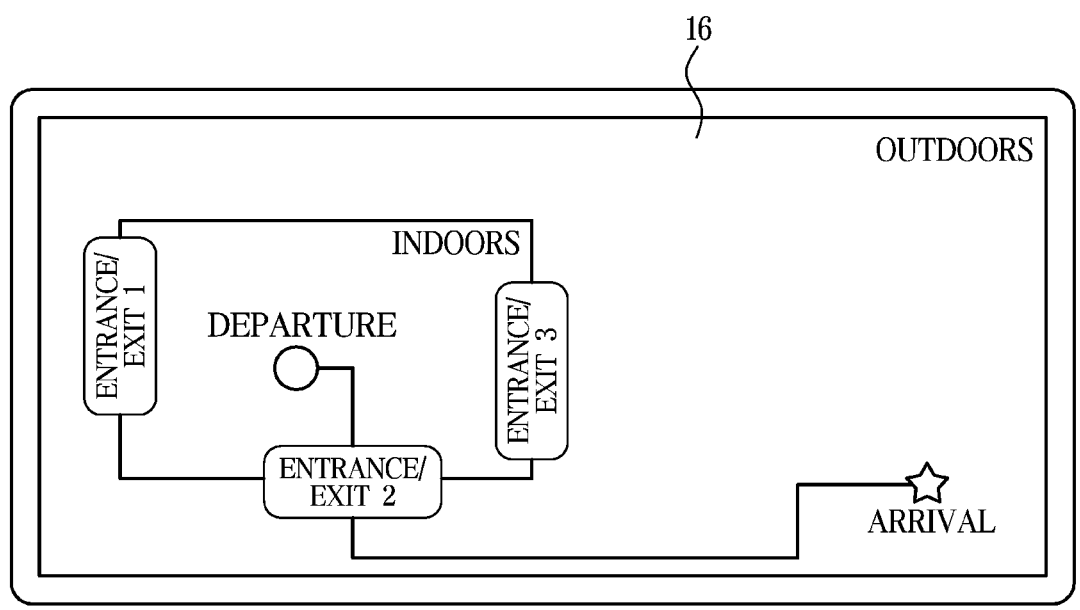
FIGS. 4 to 7 are diagrams illustrating screens displaying routes including a route determined as a route to be guided as a shortest path.

FIG. 4 illustrates an example where a departure point input by a user is indoors and an arrival point input by the user is outdoors.

Also, it is illustrated in FIG. 4 that the route to be guided as the shortest path, which is determined according to a user input or external environment, is an indoor route.

First, because the departure point is indoors and the arrival point is outdoors, an exit to go out of an indoor place is required to be determined.

In this case, the controller 13 may determine an exit closest to a location of the user who is indoors using indoor information stored in the memory 15 or received from the server 20.

When the exit closest to the departure point of the user is determined, the controller 13 may control the display module 16 to display an indoor route to the closest exit, and then to display a route from the exit to the arrival point.

In FIG. 4, because the exit closest to the departure point of the user is an 'entrance/exit 2', the controller 13 may control the display module 16 to display the indoor route from the departure point to the entrance/exit 2 and the route from the entrance/exit 2 to the arrival point.

Accordingly, the user may be provided with the shortest route guidance for the indoor route.

Figure 5:
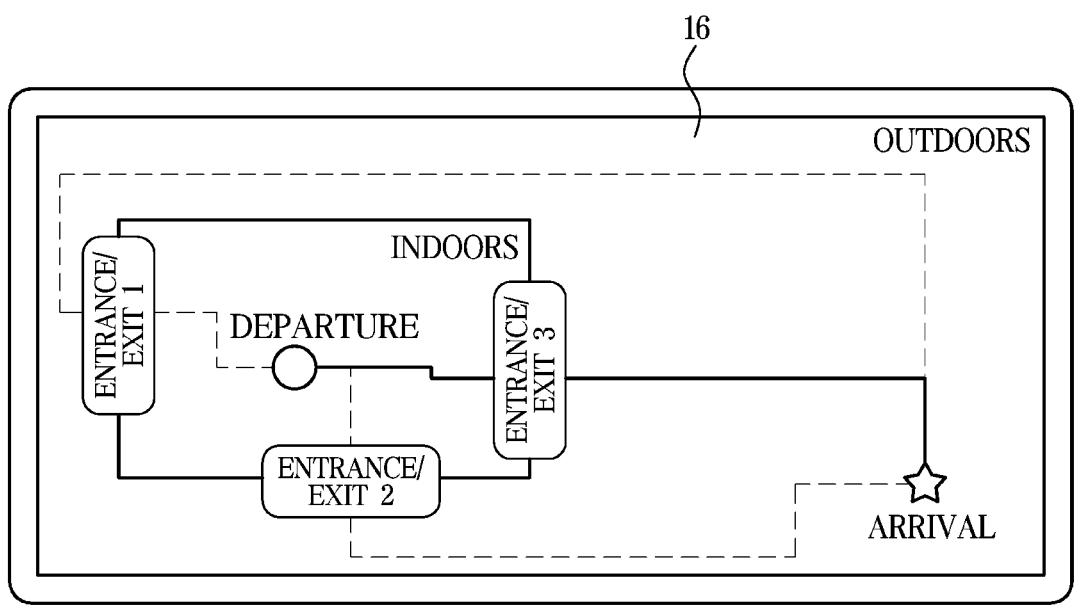

FIG. 5 illustrates an example where a departure point input by a user is indoors and an arrival point input by the user is outdoors.

Also, it is illustrated in FIG. 5 that the route to be guided as the shortest path, which is determined according to a user input or external environment, is an outdoor route.

First, because the departure point is indoors and the arrival point is outdoors, an exit to go out of an indoor place is required to be determined.

In this case, the controller 13 may determine an exit that exists indoors using indoor information stored in the memory 15 or received from the server 20.

Because the route to be guided as the shortest path is the outdoor route, the controller 13 may determine an exit closest to the arrival point among the exits that exist indoors.

Accordingly, the controller 13 may control the display module 16 to display an indoor route from the departure point to the determined exit, and then to display a route from the exit to the arrival point.

In FIG. 5, because the exit closest to the arrival point of the user is an 'entrance/exit 3', the controller 13 may control the display module 16 to display the route from the departure point to the entrance/exit 3 and the outdoor route from the entrance/exit 3 to the arrival point.

Thus, the user may be provided with the shortest route guidance for the outdoor route.

Figure 6:
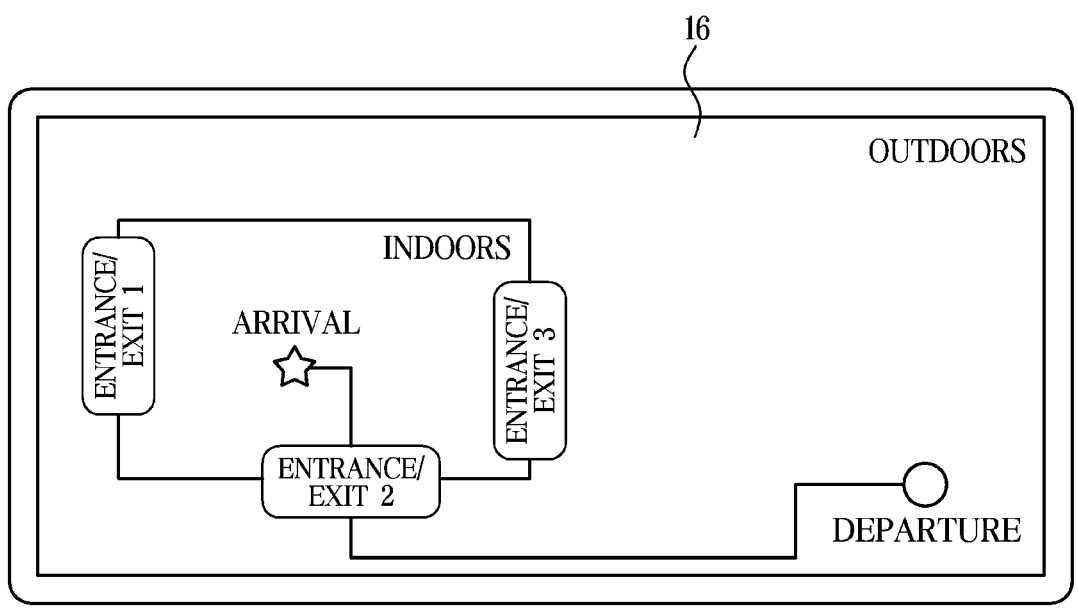

FIG. 6 illustrates an example where a departure point input by a user is outdoors and an arrival point input by the user is indoors.

Also, it is illustrated in FIG. 6 that the route to be guided as the shortest path, which is determined according to a user input or external environment, is an indoor route.

First, because the departure point is outdoors and the arrival point is indoors, an entrance to go to an indoor place is required to be determined.

In this case, the controller 13 may determine an entrance closest to the arrival point among entrances that exist indoors using indoor information stored in the memory 15 or received from the server 20.

When the entrance closest to the arrival point of the user is determined, the controller 13 may control the display module 16 to display an outdoor route to the closest entrance, and then to display a route from the entrance to the arrival point.

In FIG. 6, because the entrance closest to the arrival point of the user is an 'entrance/exit 2', the controller 13 may control the display module 16 to display the route from the departure point to the entrance/exit 2 and the indoor route from the entrance/exit 2 to the arrival point.

Accordingly, the user may be provided with the shortest route guidance for the indoor route.

Figure 7:
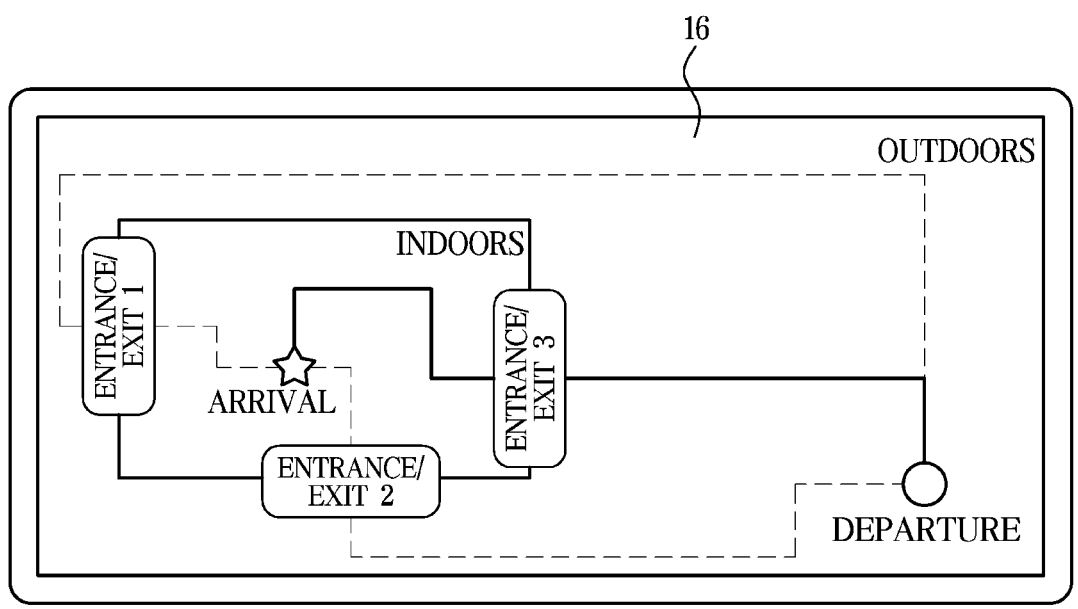

FIG. 7 illustrates an example where a departure point input by a user is outdoors and an arrival point input by the user is indoors.

Also, it is illustrated in FIG. 7 that the route to be guided as the shortest path, which is determined according to a user input or external environment, is an outdoor route.

First, because the departure point is outdoors and the arrival point is indoors, an entrance to go to an indoor place is required to be determined.

In this case, the controller 13 may determine an entrance that exists indoors using indoor information stored in the memory 15 or received from the server 20.

Because the route to be guided as the shortest path is the outdoor route, the controller 13 may determine an entrance closest to the departure point among the entrances that exist indoors.

That is, the controller 13 may acquire information about all routes from the departure point to a plurality of entrances that exist indoors where the arrival point is located, compare the acquired information about all of the routes, and determine the entrance closest to the departure point.

Accordingly, the controller 13 may control the display module 16 to display an outdoor route from the departure point to the determined entrance, and then to display a route from the entrance to the arrival point.

In FIG. 7, because the entrance closest to the departure point of the user is an 'entrance/exit 3', the controller 13 may control the display module 16 to display the outdoor route from the departure point to the entrance/exit 3 and the route from the entrance/exit 3 to the arrival point.

Thus, the user may be provided with the shortest route guidance as the outdoor route.

As described above, the controller 13 may determine the route to be guided as the shortest path based on the user input or external environment, and provide route guidance according to the determined route, and thus the user may be provided with an optimized route guidance.

Figure 8:
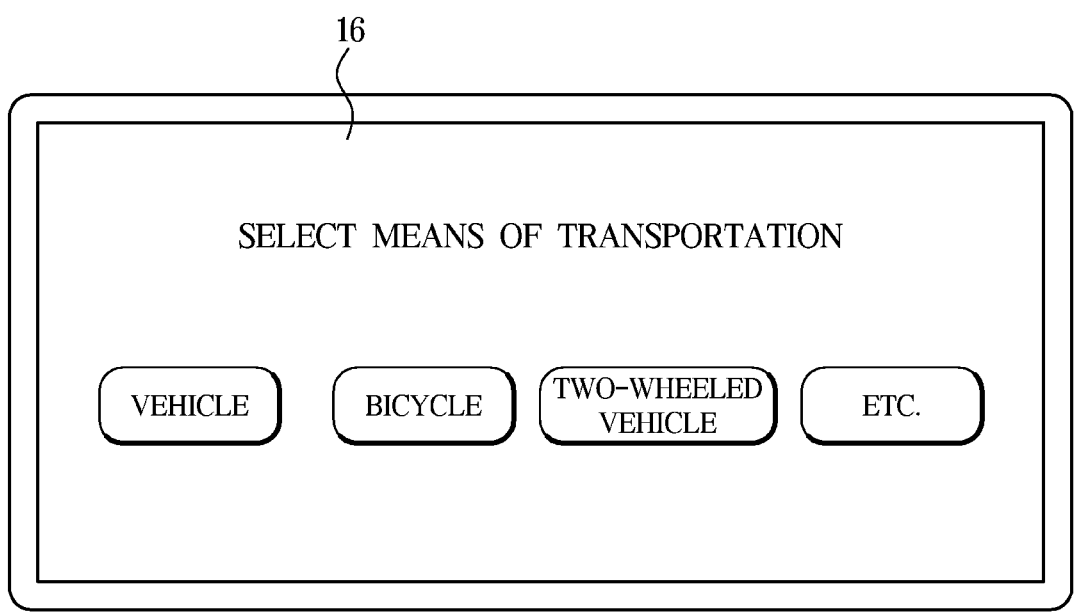
FIG. 8 is a diagram illustrating a screen allowing a user to select a means of transportation.

FIG. 8 is a diagram illustrating a screen allowing a user to select a means of transportation.

Since the user may use other means of transportation such as a bicycle or a two-wheeled vehicle, in addition to a vehicle, an indoor entrance/exit is required to be determined differently considering the above.

For example, when the user uses a vehicle, the vehicle is required to be parked in a parking lot, and thus the closer the entrance to the parking lot, the more convenient it may be for the user.

Accordingly, when the user inputs a vehicle as the means of transportation, the controller 13 may determine an entrance adjacent to the parking lot among entrances existing indoors, and perform route guidance based thereon.

In addition, when the user uses a bicycle or a two-wheeled vehicle, the user may park the bicycle or two-wheeled vehicle on a pedestrian road, bicycle road, or a general road to enter an indoor place.

Accordingly, when the user inputs a bicycle or a two-wheeled vehicle as the means of transportation, the controller 13 may determine an entrance adjacent to an outdoor place among the entrances existing indoors, and perform route guidance based thereon.

As such, the route guidance is performed by determining an entrance/exit differently depending on a type of the means of transportation used by the user, thereby improving user convenience.

Figure 9:
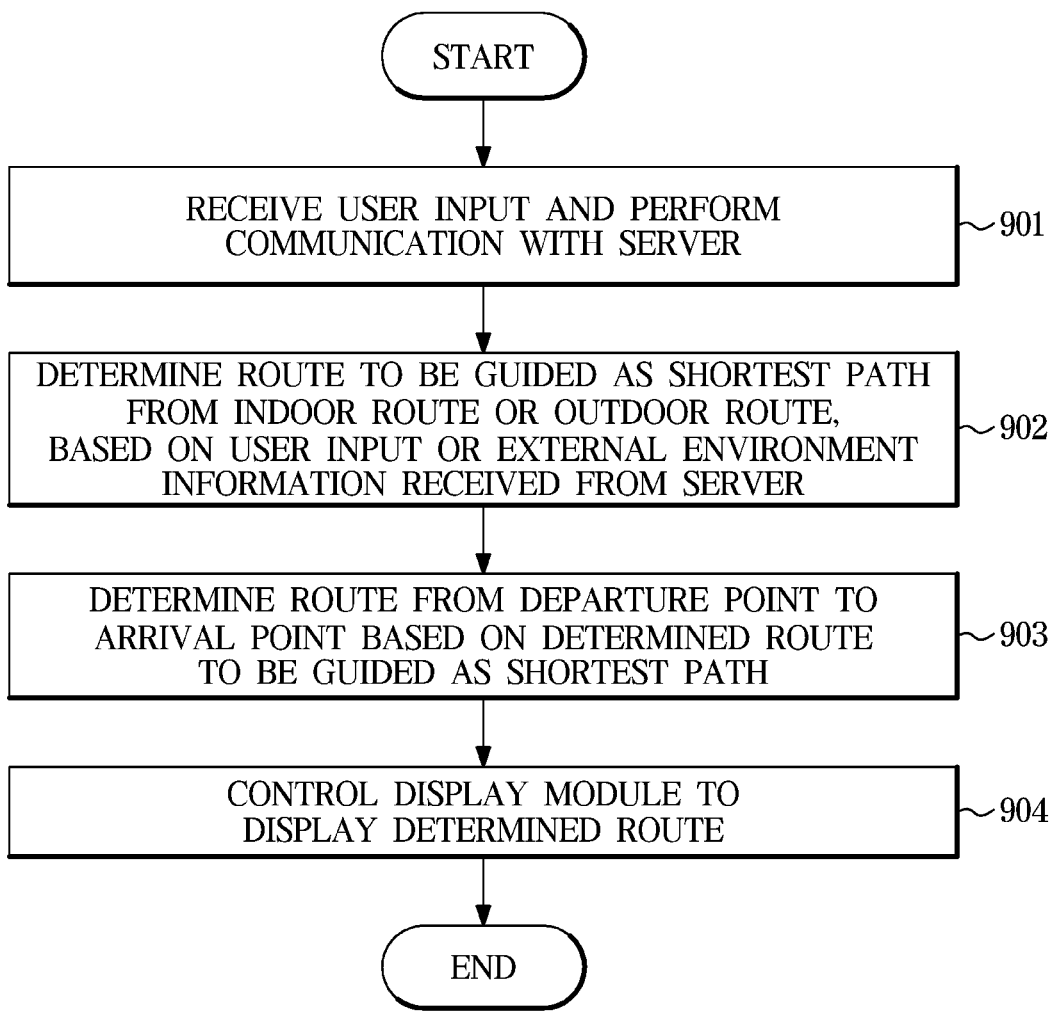
FIG. 9 is a flowchart illustrating operations of providing route guidance.

FIG. 9 is a flowchart illustrating operations of providing route guidance.

First, the input module 12 may receive a user input from a user and the communicator 11 may perform communication with the server 20 (901).

Here, the user input may be information about a departure point, an arrival point, a route for which a shortest route guidance is desired, and a means of transportation used by the user.

At least one of current weather environment information or traffic environment information may be received from the server 20 by performing communication with the server 20.

A route to be guided as a shortest path may be determined from among an indoor route or an outdoor route, based on the received user input or external environment information received from the server 20 (902).

Afterwards, a route to be guided to the user may be determined considering the determined route to be guided as the shortest path, and a departure point and arrival point input by the user (903).

The display module 16 may be controlled to display route guidance information to provide the user with the determined route (904).

Accordingly, the user may be provided with route guidance optimized in consideration of the user input and external environment.

Figure 10:
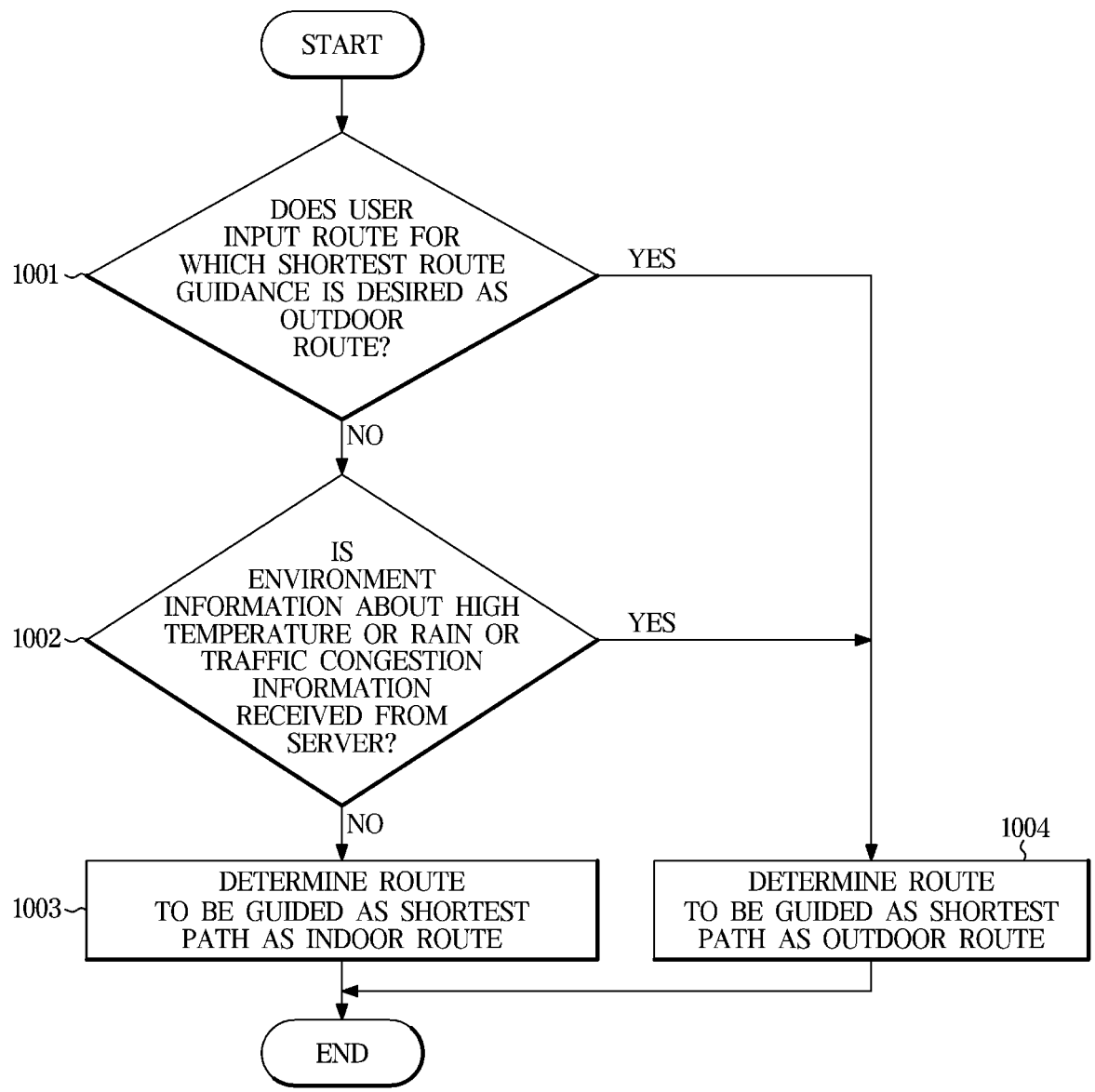
FIG. 10 is a flowchart illustrating operations of determining a route to be guided as a shortest path.

FIG. 10 is a flowchart illustrating operations where the controller 13 determines a route to be guided as the shortest path.

First, it is determined whether a route for which a shortest route guidance is desired is an outdoor route is received from a user (1001).

When the user inputs the route for which the shortest route guidance is desired as an outdoor route (Yes in operation 1001), the outdoor route may be determined as a route to be guided as a shortest path (1004).

When the user inputs the route for which the shortest route guidance is desired as an indoor route (No in operation 1001), whether external environment information received from the server 20 is received is determined (1002).

When environment information about a high temperature or rain or traffic congestion information is received from the server 20 (Yes in operation 1002), the route to be guided as the shortest path may be determined as the outdoor route (1004), since the user would not prefer to stay outdoors for a long period of time in situations such as rain, high temperature, or traffic congestion.

When the environment information about a high temperature or rain or traffic congestion information is not received from the server 20 (No in operation 1002), the route to be guided as the shortest path may be determined as the indoor route (1003).

According to the above-described operations, the user may be provided with an optimized route guidance considering the user input according to the user's preference and the external environment.

As is apparent from the above, according to the embodiments of the disclosure, the electronic device and the control method thereof can set a shortest route to be guided based on a user's selection or an external environment, thereby providing a user with an optimized route guidance service.

Although embodiments have been described for illustrative purposes, those skilled in the art will appreciate that various modifications, additions and substitutions are possible, without departing from the scope and spirit of the disclosure. Therefore, embodiments have not been described for limiting purposes.

What is claimed is:

1. An electronic navigation system comprising:
an electronic display;
a communication circuit configured to communicate with a server;
an electronic input device configured to receive information about a type of transportation from a user; and
a controller comprising a processor and a memory coupled to the processor with instructions stored thereon, wherein the instructions, when executed by the processor enable the controller to:
   determine a route to be guided between a departure point and an arrival point, wherein the route comprises an outdoor segment selected from a first outdoor route and a second outdoor route, and an indoor segment selected from a first indoor route and a second indoor route, wherein the first outdoor route is shorter than the second outdoor route, and the first indoor route is shorter than the second indoor route, the first indoor route, and the second indoor route, the first outdoor route and the second outdoor route are stored in the memory, wherein the route to be guided is determined by:
      selecting the first indoor route and the second outdoor route in response to the user requesting a shortest indoor path via the electronic input device, and
      selecting the second indoor route and the first outdoor route in response to information about an external environment received from the server via the communication circuit;
   in response to a first vehicle being input as the type of transportation, setting an indoor entrance and an indoor exit as an entrance and an exit close to a parking lot, respectively, to control the electronic display to display route guidance information that is different from route guidance displayed in response to a two-wheeled vehicle being selected as the type of transportation, the route guidance being related to the route of the two-wheeled vehicle between the same departure point as the first vehicle and the same arrival point as the first vehicle; and
   control the electronic display of the electronic navigation system to display the determined route.

2. The electronic navigation system of claim 1, wherein the information about the external environment comprises weather environment information or traffic environment information.

3. The electronic navigation system of claim 2, wherein the instructions, when executed by the processor enable the controller to select the second indoor route and the first outdoor route in response to the weather environment information indicating rain or a high temperature, temperature in the weather environment information.

4. The electronic navigation system of claim 2, wherein the instructions, when executed by the processor enable the controller to select the second indoor route and the first outdoor route in response to the traffic environment information indicating traffic congestion.

5. The electronic navigation system of claim 1, wherein:
the departure point is indoors, the arrival point is outdoors, and the first indoor route and the second indoor route are selected as the route to be guided; and
the instructions, when executed by the processor, enable the controller to control the electronic display to display shortest route guidance information from the departure point to the indoor exit and to display route guidance information from the indoor exit to the arrival point.

6. The electronic navigation system of claim 1, wherein:
the departure point is indoors, the arrival point is outdoors, and the second indoor route and the first outdoor route are selected as the route to be guided; and
the instructions, when executed by the processor, enable the controller to control the electronic display to display shortest route guidance information to the arrival point from a first exit closest to the arrival point among a plurality of indoor exits and to display route guidance information from the departure point to the first exit.

7. The electronic navigation system of claim 1, wherein:
the departure point is outdoors, the arrival point is indoors, and the first indoor route and the second indoor route are selected as the route to be guided; and
the instructions, when executed by the processor, enable the controller to control the electronic display to display route guidance information from the departure point to the indoor entrance and to display shortest route guidance information from the indoor entrance to the arrival point.

8. The electronic navigation system of claim 1, wherein:
the departure point is outdoors, the arrival point is indoors, and the second indoor route and the first outdoor route are selected as the route to be guided; and
the instructions, when executed by the processor, enable the controller to control the electronic display to display shortest route guidance information from the departure point to a first entrance closest to the departure point among a plurality of indoor entrances and to display route guidance information from the first entrance to the arrival point.

9. The electronic navigation system of claim 8, wherein the instructions, when executed by the processor, enable the controller to:
acquire route information about all paths from the departure point to the plurality of indoor entrances located indoors where the arrival point is located; and
control the electronic display to display shortest route guidance information from the departure point to the first entrance closest to the departure point by comparing the acquired route information about all of the paths.

10. The electronic navigation system of claim 1, wherein, the instructions, when executed by the processor, enable the controller to: in response to the two-wheeled vehicle or a bicycle being input as the type of transportation, set the indoor entrance and the indoor exit as an entrance and an exit close to an outside, respectively, to control the electronic display to display route guidance information.

11. A control method of an electronic navigation system, the control method comprising:
receiving, by an electronic input device of the electronic navigation system, information about a type of transportation, a departure point, and an arrival point from a user;
receiving, by the electronic navigation system, information about an external environment from a server;
determining a route to be guided between the departure point and the arrival point, wherein the route comprises an outdoor segment selected from a first outdoor route and a second outdoor route, and an indoor segment selected from a first indoor route and a second indoor route, wherein the first outdoor route is shorter than the second outdoor route, and the first indoor route is shorter than the second indoor route, the first indoor route, and the second indoor route, the first outdoor route and the second outdoor route are stored in a memory, and the route to be guided is determined by:
selecting the first indoor route and the second outdoor route in response to the user requesting a shortest indoor path via electronic input device, and
selecting the second indoor route and the first outdoor route in response to the information about the external environment received from the server;
in response to a first vehicle being input as the type of transportation, setting an indoor entrance and an indoor exit as an entrance and an exit close to a parking lot, respectively, to control an electronic display to display route guidance information that is different from route guidance displayed in response to a two-wheeled vehicle being selected as the type of transportation, the route guidance being related to the route of the two-wheeled vehicle between the same departure point as the first vehicle and the same arrival point as the first vehicle; and
displaying the determined route on the electronic display of the electronic navigation system.

12. The control method of claim 11, wherein the information about the external environment comprises weather environment information or traffic environment information.

13. The control method of claim 12, wherein the second indoor route and the first outdoor route are selected in response to the weather environment information indicating rain or a high temperature.

14. The control method of claim 12, wherein the second indoor route and the first outdoor route are selected in response to the traffic environment information indicating traffic congestion.

15. The control method of claim 11, wherein:
the departure point is indoors, the arrival point is outdoors, and the first indoor route and the second indoor route are selected as the route to be guided; and
displaying the determined route comprises displaying shortest route guidance information from the departure point to the indoor exit and displaying route guidance information from the indoor exit to the arrival point.

16. The control method of claim 11, wherein:
the departure point is indoors, the arrival point is outdoors, and the second indoor route and the first outdoor route are selected as the route to be guided; and
displaying the determined route comprises displaying shortest route guidance information to the arrival point from a first exit closest to the arrival point among a plurality of indoor exits and displaying route guidance information from the departure point to the first exit.

17. The control method of claim 11, wherein:
the departure point is outdoors, the arrival point is indoors, and the first indoor route and the second indoor route are selected as the route to be guided; and
displaying the determined route comprises displaying route guidance information from the departure point to the indoor entrance and displaying shortest route guidance information from the indoor entrance to the arrival point.

18. The control method of claim 11, wherein:
the departure point is outdoors, the arrival point is indoors, and the second indoor route and the first outdoor route are selected as the route to be guided; and
displaying the determined route comprises displaying shortest route guidance information from the departure point to a first entrance closest to the departure point among a plurality of indoor entrances and displaying route guidance information from the first entrance to the arrival point.

19. The control method of claim 18, wherein displaying the shortest route guidance information from the departure point to the first entrance closest to the departure point among the plurality of indoor entrances comprises:
acquiring route information about all paths from the departure point to the plurality of indoor entrances located indoors where the arrival point is located; and
displaying the shortest route guidance information from the departure point to the first entrance closest to the departure point by comparing the acquired route information about all of the paths.

20. The control method of claim 11, wherein, in response to the two-wheeled vehicle or a bicycle being the type of transportation, displaying the determined route comprises setting the indoor entrance and the indoor exit as an entrance and an exit close to an outside, respectively, to display route guidance information.

21. A non-transitory computer readable medium, with instructions stored thereon, wherein the instructions, when executed by a processor enable the processor to perform the steps of:

receiving information about a type of transportation from a user;

determining a route to be guided between a departure point and an arrival point, wherein the route comprises an outdoor segment selected from a first outdoor route and a second outdoor route, and an indoor segment selected from a first indoor route and a second indoor route, wherein the first outdoor route is shorter than the second outdoor route, and the first indoor route is shorter than the second indoor route, the first indoor route, and the second indoor route, the first outdoor route and the second outdoor route are stored in a memory, wherein the route to be guided is determined by:

selecting the first indoor route and the second outdoor route in response to the user requesting a shortest indoor path via an electronic input device, and selecting the second indoor route and the first outdoor route in response to information about an external environment received from a server via a communication circuit;

in response to a first vehicle being input as the type of transportation, setting an indoor entrance and an indoor exit as an entrance and an exit close to a parking lot, respectively, to control an electronic display to display route guidance information that is different from route guidance displayed in response to a two-wheeled vehicle being selected as the type of transportation, the route guidance being related to the route of the two-wheeled vehicle between the same departure point as the first vehicle and the same arrival point as the first vehicle; and controlling the electronic display of an electronic navigation system to display the determined route.

22. The non-transitory computer readable medium of claim 21, wherein the information about the external environment comprises weather environment information or traffic environment information.

23. The non-transitory computer readable medium of claim 22, wherein the instructions, when executed by the processor, further enable the processor to perform the step of:

selecting the second indoor route and the first outdoor route in response to the weather environment information indicating rain or a high temperature, temperature in the weather environment information.

24. The non-transitory computer readable medium of claim 21, wherein:

the departure point is indoors, the arrival point is outdoors, and the first indoor route and the second indoor route are selected as the route to be guided; and the instructions, when executed by the processor, enable the processor to control the electronic display to display shortest route guidance information from the departure point to the indoor exit and to display route guidance information from the indoor exit to the arrival point.

25. The non-transitory computer readable medium of claim 21, wherein:

the departure point is indoors, the arrival point is outdoors, and the second indoor route and the first outdoor route are selected as the route to be guided; and the instructions, when executed by the processor, enable the processor to control the electronic display to display shortest route guidance information to the arrival point from a first exit closest to the arrival point among a plurality of indoor exits and to display route guidance information from the departure point to the first exit.

26. The non-transitory computer readable medium of claim 21, wherein the instructions, when executed by the processor, further enable the processor to perform the step of:

in response to the two-wheeled vehicle or a bicycle being input as the type of transportation, setting the indoor entrance and the indoor exit as an entrance and an exit close to an outside, respectively, to control the electronic display to display route guidance information.

\* \* \* \* \*